Patented Aug. 9, 1949

2,478,859

UNITED STATES PATENT OFFICE 2,478,859

ALKYLENE OXIDE CONDENSATION PRODUCTS OF ALIPHATIC ACYLCARBAMYLGUANIDINES

Joseph J. Carnes, Greenwich, and Ruth B. Warner, Stamford, Conn., assignors to American Cyanamid Company, New York, N. Y., a corporation of Maine No Drawing. Application June 18, 1946, Serial No. 677,522

4 Claims. (Cl. 260—404.5)

This invention relates to condensation products of higher aliphatic acylcarbamylguanidines, in which the aliphatic radical contains 8 or more carbon atoms, with lower alkylene oxides such as ethylene oxide, propylene oxide, butylene oxide, epichlorhydrin and the like. The invention includes the condensation products themselves and wetting, emulsifying and textile-softening compositions containing them.

In the copending application of Daniel E. Nagy, Serial No. 579,304 filed February 22, 1945, now abandoned, it is shown that the higher aliphatic acylcarbamylguanidines are readily obtained by reacting dicyandiamide with higher fatty acids in the presence of strong inorganic acids such as sulfuric acid or phosphoric acid, which act as dehydrating agents. The aliphatic acylcarbamylguanidines in which the aliphatic radical contains at least 8 carbon atoms are relatively waterinsoluble, although they are soluble in water acidified with acetic or hydrochloric acid.

We have now discovered that by condensing these higher aliphatic acylcarbamylguanidines with lower alkylene oxides or their derivatives such as ethylene oxide, propylene oxide, butylene oxide, epichlorhydrin and the like, hydrophilic or water-solubilizing groups can be introduced to impart definite surface-active properties. We find that by starting with aliphatic acylcarbamylguanidines in which the aliphatic radical contains at least 8 carbon atoms and preferably about 10–18 carbon atoms, compounds having wetting, dispersing and textile-softening properties are obtained when a minimum of about 4–6 and preferably about 8–20 mols of ethylene oxide are combined with 1 mol of carbamylguanidine. With aliphatic acylcarbamylguanidines of higher molecular weight, such as those obtained from vegetal (animal or vegetable) oils such as coconut oil, olive oil, cottonseed oil, soya bean oil and the like, it is sometimes advisable to use even larger proportions of ethylene, propylene or butylene oxide, and where products of good water-solubility are desired we may use as much as 50 mols of ethylene or propylene oxide for each mol of the higher aliphatic acylcarbamylguanidines.

The condensation reaction between the higher aliphatic acylcarbamylguanidines and the lower alkylene oxides containing 2–4 carbon atoms; i. e., ethylene oxide, propylene oxide, butylene oxide and their halogenation products such as epichlorhydrin is preferably carried out by suspending the acylcarbamylguanidine in a suitable solvent and introducing the alkylene oxide compound. The condensation reaction may be carried out under a wide variety of operating conditions, depending on the type of reagent and the number of lower alkyl oxide molecules to be combined. In most cases satisfactory results are obtained with ethylene oxide by operating at atmospheric pressures and temperatures varying from about 45°–100° C., but when relatively large quantities of ethylene oxide on the order of 15–30 or more mols are to be combined with 1 mol of the acylcarbamylguanidine it is sometimes preferable to operate under superatmospheric pressures up to about 5–6 atmospheres. The same is true when using propylene or butylene oxide since they are less active than is ethylene oxide and require correspondingly higher temperatures and pressures. Under these conditions reaction temperatures up to 150°–160° C. and pressures up to about 5–6 atmospheres may be employed.

The alkylene oxide condensation is preferably carried out in the presence of a polar solvent such as ethyl alcohol or one of the propyl or butyl alcohols, and if desired a basic condensation catalyst may be added to increase the speed of the condensation reaction or reduce the operating temperature and pressure. For example, it is known that about 1% of sodium ethyl alcoholate will function as a catalyst for the condensation of ethylene oxide with amides of higher fatty acids, and we find that this catalyst can also be used in condensing ethylene oxide with higher aliphatic acylcarbamylguanidines. Even better results are obtained by using tertiary amines such as triethylamine as catalyst, particularly in conjunction with the use of tertiary butanol as solvent, as illustrated in the accompanying examples. However, lower alkylene oxide condensations using this class of catalysts and solvents are not claimed specifically in the present application, since they are claimed in the copending application of Joseph J. Carnes, Serial No. 677,523, filed June 18, 1946.

From the foregoing discussion it is evident that any aliphatic acylcarbamylguanidine in which the aliphatic radical contains at least 8 carbon atoms may be condensed with a lower alkylene oxide, or halogen substitution product thereof, to form the water-soluble products of the present invention. Typical compounds that may be used as starting materials are lauroylcarbamylguanidine, myristoylcarbamylguanidine, palmitylcarbamylguanidine, oleylcarbamylguanidine, stearylcarbamylguanidine, linoleylcarbamylguanidine and the like. At noted above, these are derivatives of higher fatty acids obtainable from natural vegetable oils, which are available in large quantities at relatively low cost.

The products of the present invention may therefore be defined as water-soluble ethenoxy condensation products of water-insoluble aliphatic acylcarbamyl guanidines. These compounds can be expressed by the formula

in which $n$ is a whole number from 2–5 inclusive, $x$ is a number from 4–50 inclusive, and R is an aliphatic radical containing at least 8 and preferably about 10–18 carbon atoms. The preferred compounds of our invention are the lauroyl, myristoyl, oleyl and stearyl derivatives of carbamylguanidines in which $x$ is from about 8 to about 20, inclusive. Compounds of this type have good wetting and softening properties for textiles, and are also useful as cationic emulsifying agents. The invention will be illustrated in greater detail by the following specific examples to which, however, it is not limited.

Example 1

0.88 gram mols of lauric acid are mixed with 9.1 gram mols of sulfuric acid containing 3% of dissolved $SO_3$ and 1 gram mol of dicyandiamide, preferably in a finely divided state, is added slowly and with vigorous stirring so that it remains in contact with the sulfuric acid for only a short time prior to its reaction with the lauric acid. During addition of the dicyandiamide the temperature of the mixture is maintained at 20°–30° C. by positive cooling, if necessary, and the agitation is continued at this temperature after the dicyandiamide has all been added until no further heat is evolved. The mixture is then poured into cracked ice so that a precipitate of the lauroylcarbamylguanidine sulfate is formed. The solid product is filtered and washed thoroughly with water and acetone to remove any unreacted lauric acid, after which it is suspended in methanol and treated with a slight excess of ammonia. After vigorous stirring and cooling in an ice bath the mixture is diluted with water and filtered, whereupon lauroylcarbamylguanidine is obtained as a product melting at 220° C.

28 grams of the lauroylcarbamylguanidine were suspended in a mixture of 100 cc. of tertiary butanol and 12 cc. of triethylamine and heated to 65°–75° C. under a reflux condenser supplied with ice-cold water. Ethylene oxide was bubbled through this slurry at atmospheric pressure. After a short time the mixture became clear, and when 46 grams of ethylene oxide had been absorbed the passage of gas was discontinued. This required about 6 hours. The reaction mixture was then refluxed for an additional hour, during which time the temperature rose to 88° C., after which the tertiary butanol and triethylamine were removed by distilling at reduced pressure. The product, a tan, viscous liquid, was soluble in water and possessed good dispersing and emulsifying properties.

Example 2

Myristoylcarbamylguanidine was prepared as described in Example 1 by introducing 75 grams of powdered dicyandiamide into a mixture of 114 grams of myristic acid and 550 grams of a mixture of equal parts of 96% $H_2SO_4$ and 20% oleum at 20°–25° C., reacting for about 2 hours, pouring on ice, filtering and liberating the free carbamylguanidine by slurring in 5% $NH_4OH$ solution.

Ethylene oxide was bubbled through a slurry containing 50 grams of the product in 100 cc. of tertiary butanol and 15 cc. of triethylamine at a temperature between 70° C. and 80° C. After a short time the mixture became clear and when 71 grams of ethylene oxide had been absorbed the passage of gas was discontinued. The mixture was then refluxed for 1 hour, during which time the temperature rose to 96° C., and the triethylamine and butanol were removed by distilling at reduced pressure. The product, a tan, viscous liquid weighing 122 grams, was soluble in water and possessed wetting and emulsifying properties.

What we claim is:

1. Water-soluble ethenoxy condensation products of water-insoluble aliphatic acylcarbamylguanidines corresponding to the formula

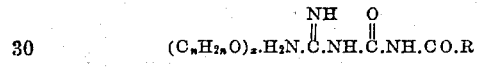

in which $n$ is a whole number from 2–4 inclusive, $x$ is a number from 4–50 inclusive, and R is an aliphatic radical containing from 8 to 18 carbon atoms.

2. Water-soluble ethylene oxide condensation products of water-insoluble aliphatic acylcarbamylguanidines in which the aliphatic radical contains from 8 to 18 carbon atoms said condensation products containing 4–50 mols of combined ethylene oxide.

3. A water-soluble ethylene oxide condensation product of lauroylcarbamylguanidine said condensation product containing 4–50 mols of combined ethylene oxide.

4. A water-soluble ethylene oxide condensation product of myristoylcarbamylguanidine said condensation product containing 4–50 mols of combined ethylene oxide.

JOSEPH J. CARNES.
RUTH B. WARNER.

REFERENCES CITED

The following references are of record in the file of this patent:

UNITED STATES PATENTS

| Number | Name | Date |
| --- | --- | --- |
| 1,924,698 | Neelmeier et al. | Aug. 29, 1933 |
| 2,273,687 | Bock | Feb. 17, 1942 |
| 2,324,354 | Binder | July 13, 1943 |
| 2,373,230 | De Groote et al. | Apr. 10, 1945 |

FOREIGN PATENTS

| Number | Country | Date |
| --- | --- | --- |
| 364,104 | Great Britain | Dec. 28, 1931 |